United States Patent [19]

Böse

[11] 4,447,802

[45] May 8, 1984

[54] WARNING LIGHT

[76] Inventor: Herbert Böse, Am Dachsbau 9, Neuenhein/Ts, Fed. Rep. of Germany, D-6232

[21] Appl. No.: 286,253

[22] Filed: Jul. 23, 1981

[30] Foreign Application Priority Data

Jul. 25, 1980 [DE] Fed. Rep. of Germany ....... 3028219

[51] Int. Cl.³ .......................... E01F 9/00; B60Q 1/00
[52] U.S. Cl. .................. 340/119; 340/114 R;
340/123; 340/139; 340/84; 340/90; 40/605;
40/610; 40/612; 40/573; 116/63 P; 362/167;
362/190
[58] Field of Search ............... 340/119, 114 R, 114 B,
340/127, 128, 138–141, 123, 84, 87, 90, 103,
107–110, 321, 41 A; 40/612, 618, 605, 564, 573,
574, 575, 610; 116/63 R, 63 P, 63 C; 362/157,
190, 191, 362, 367, 368, 370, 371, 167

[56] References Cited

U.S. PATENT DOCUMENTS

| 2,528,490 | 11/1950 | Berry | 340/90 |
| 2,613,463 | 10/1952 | Transue | 116/63 P |
| 2,736,879 | 2/1956 | Ferguson | 340/84 |
| 3,049,614 | 8/1962 | Eikenberry | 340/84 |
| 3,500,465 | 3/1970 | Brekke | 340/90 |
| 3,999,160 | 12/1976 | McDonnell | 340/119 |

Primary Examiner—Donnie L. Crosland
Attorney, Agent, or Firm—Kurt Kelman

[57] ABSTRACT

A road traffic warning light has a block-shaped housing composed of superposed housing elements. Adjacent housing elements are interconnected by a joint so that they may be folded to collapse the housing while the housing elements form a column when erected. A warning light transmitter is mounted on each housing element.

8 Claims, 5 Drawing Figures

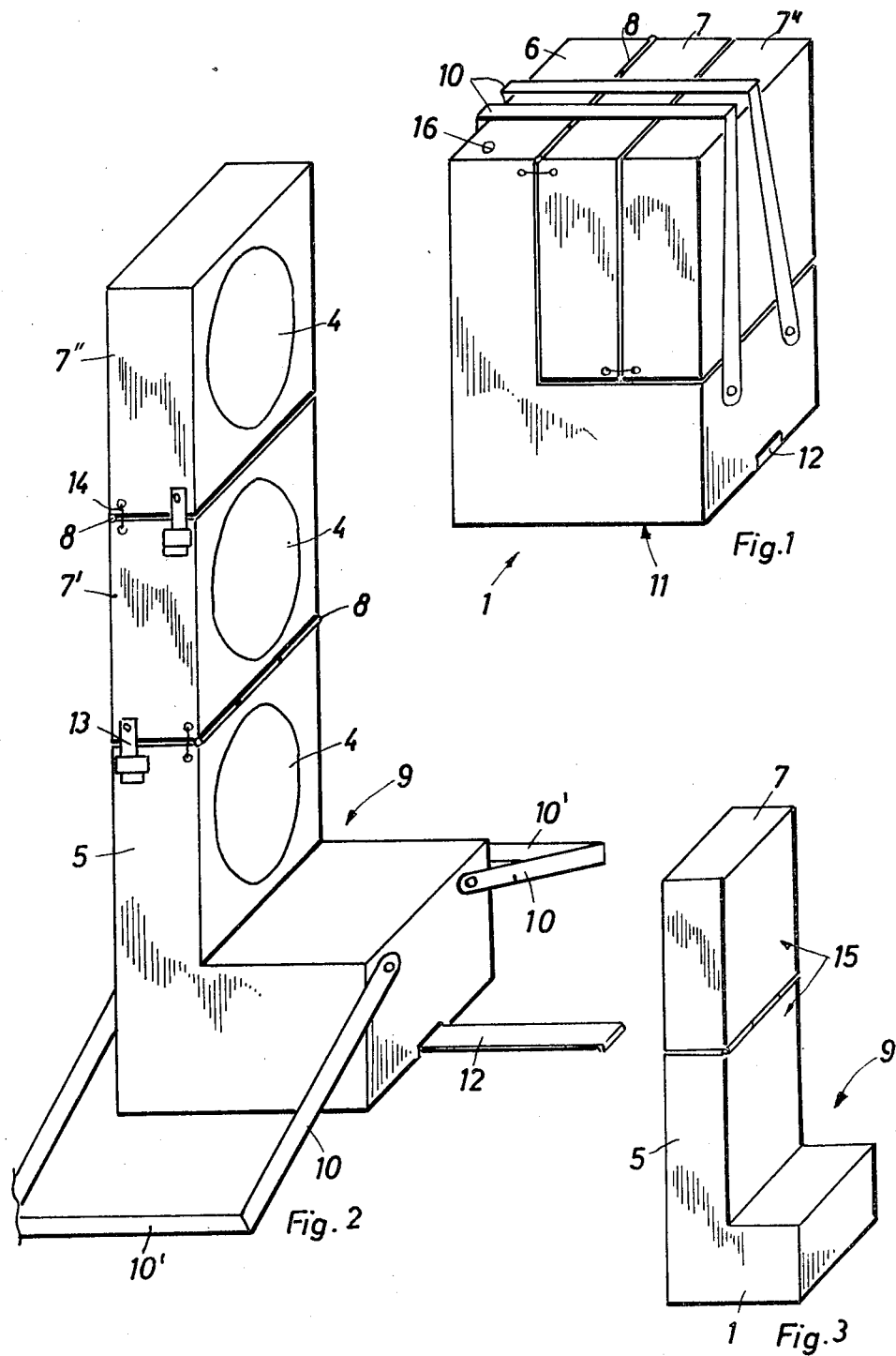

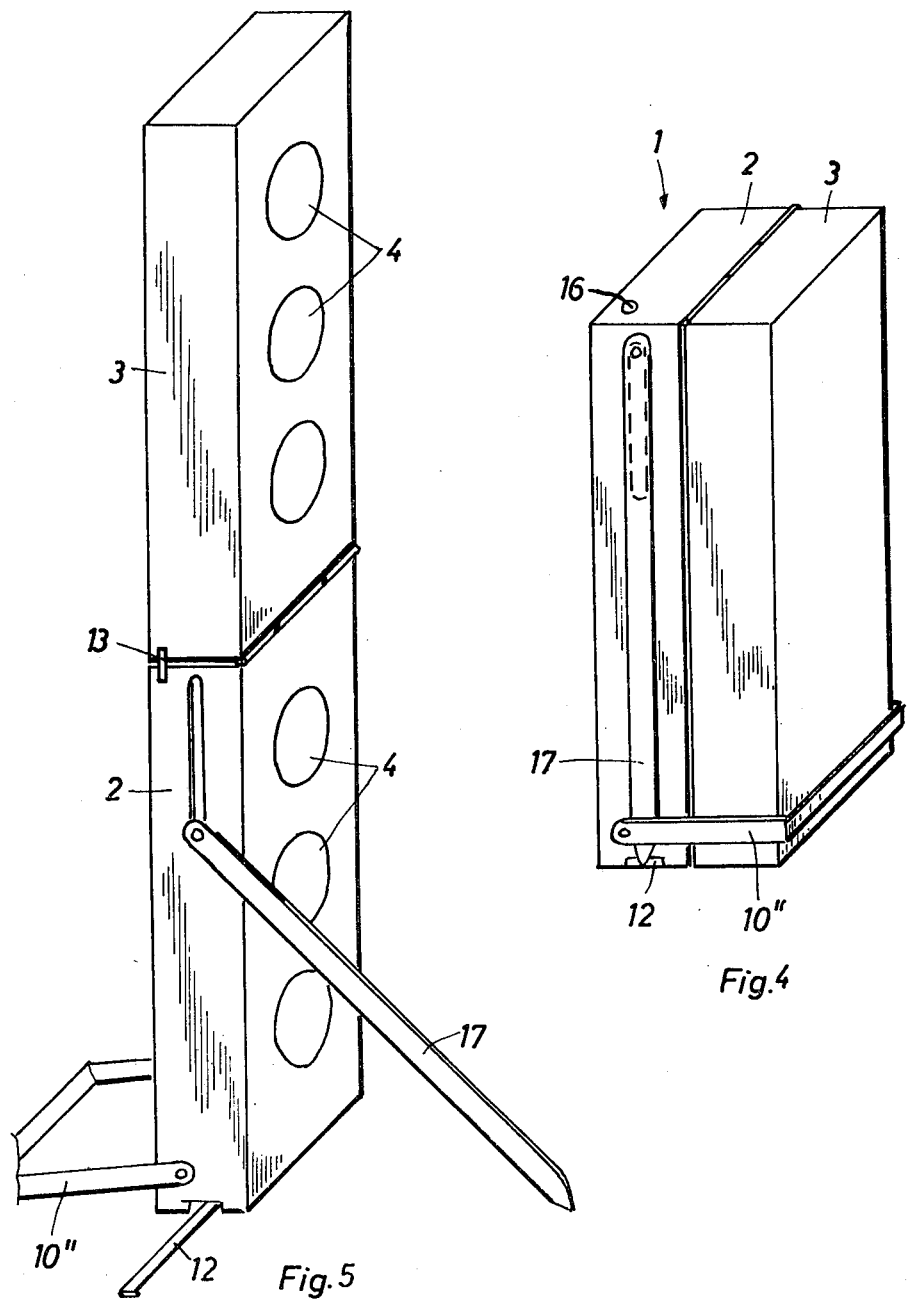

WARNING LIGHT

This invention is concerned with a road traffic warning light.

Warning lights of the type under consideration are generally known and used in their most different forms of embodiment. In particular, they are being taken along in motor vehicles in order to be placed in case of emergency at an adequate distance from the sites of accident or engine trouble or ahead of the standing motor vehicle to convey a corresponding warning to the following traffic. These prior art warning lights actually are satisfactory in terms of the desired warning function.

However, what is of disadvantage is the fact that the light signal transmitters are arranged at a relatively low height above the ground and, as a rule, only transmit a stationary or a flashing light although it has proved that a sequence of light signals transmitted into a special direction have a better warning effect as is the case, for example, with large-scale warning systems on highways in areas of lane changes.

However, the warning lights hitherto used and carried along are not suitable for a use of several light signal transmitters going on or flashing in sequence as the housings thereof permit the arrangement of one light signal transmitter only.

Accordingly, basic to the invention is the problem of improving a warning lamp of the afore-mentioned type to the effect that more than one light signal transmitter are accommodated therein, while the entire warning light can nevertheless be produced in the form of a column so that the light signal transmitters can be arranged in juxtaposition.

This problem with a warning lamp of the afore-mentioned type, in accordance with the invention, is solved with a road traffic warning light comprising a block-shaped housing composed of at least two superposed housing elements, a respective joint pivotally interconnecting adjacent ones of the housing elements for enabling the housing elements to be folded, a respective holding element between the adjacent housing elements for enabling the housing elements to be erected to form a column, and a warning light signal transmitter mounted on each one of the superposed housing elements.

This construction provides, in the collapsed condition, an easily portable compact housing which, by juxtaposing the elements thereof, can be transformed to a column, with the light signal transmitters being placed into juxtaposition. Depending on the circuiting and characterisitc quality of the light signal transmitters, it will thus be possible to have the light signal transmitters flash in a more or less quick sequence from top to bottom, thereby conveying an elevated light signal to the driver driving towards the site of accident, which is better visible, will cause the driver to reduce his speed.

The warning light of preferred embodiments thereof will now be described in more detail by way of the graphical illustration of examples.

In the drawings,

FIG. 1 perspectively shows the warning lamp in collapsed condition and in a preferred form of embodiment;

FIG. 2 shows the warning lamp in erected condition of operation;

FIG. 3 shows another form of embodiment;

FIG. 4 shows a further form of embodiment, and

FIG. 5 shows in erected condition the form of embodiment according to FIG. 4.

As disclosed by FIGS. 1, 2, in the preferred embodiment, housing 1 has a lowest housing element 5 associated to which are two further housing elements 7', 7" by way of two correspondingly disposed joints 8 such that the two housing elements 7', 7" can be tilted into the free space 9 beside lowest housing element 5 as shown in FIG. 1 so that in collapsed condition a compact block is formed, with the housing elements 7', 7" being held by the upwardly folded supporting and holding brackets 10. In the illustrated embodiment, both the housing element 5 and the two housing elements 7', 7" are respectively provided with a light signal transmitter 4 that via electric line 14 are in communication with a circuit disposed in housing 1 which is so rated that the light signal transmitters in a more or less quick sequence go on or flash from top to bottom in permanent repetition when all the housing components are erected to form a column as shown in FIG. 2. A limit switch may be provided between housing elements 7' and 5 which, when the housing element 7' is erected, activates the circuit.

In order to stabilize the erected column, holding elements 13, drop-in elements or the like are suitably provided between the foldable elements.

For stabilizing purposes, in known per se manner, serve the supporting and holding brackets 10 on the one hand and stabilizing elements 12 on the other hand that are retractable on housing 1 and which can also be disposed in retractable or swingable manner in opposite direction in cross beams 10' of the supporting and holding brackets 10.

In accordance with FIG. 3, for forming a column, only one housing element 7 is pivoted to housing element 5. Depending on the size of the front faces 15 two smaller light signal transmitters 4 can also be provided, and with a correspondingly broad formation of the housing elements it would also be possible to arrange the light signal transmitters 4 in triangular form thereby still further intensifying the danger warning.

In accordance with FIGS. 4,5 it would also be possible to form the entire warning lamp of two relatively long housing elements 2,3 that can be unfolded to form a column as shown in FIG. 5.

Assuming in the preferred embodiment according to FIGS. 1,2 that housing elements 5,7',7" have a height of, for example, 20 cm and that the lower housing part 1 has a height of, for example, 15 cm, the column will have a height of 75 cm, with the light signal running from top to bottom extending over a length of 60 cm thereby conveying a clear danger warning. In collapsed condition, the warning lamp will nevertheless have a height of only 35 cm forming a relatively small and compact block having outer dimensions of, for example, 20×20×35 cm.

The embodiments according to FIGS. 1 through 3 will be preferred not only because of their compact collapsibility but also because of the fact that housing element 1 itself already has a rather large support base.

The use of the warning lamp according to the invention is, of course, not restricted to road traffic; it can also be used, for example, with fire brigade actions or in cases of emergency.

What is claimed is:

1. A road traffic warning light comprising a block-shaped housing composed of at least two superposed housing elements, a respective joint pivotally interconnecting adjacent ones of the housing elements for enabling the housing elements to be folded, a respective holding element between the adjacent housing elements for enabling the housing elements to be erected to form a column, a warning light signal transmitter mounted on each one of the superposed housing elements, and means for stabilizing a lowest one of the superposed housing elements in an erect position, the stabilizing means comprising a support and the housing elements consisting of a lowest housing element projecting substantially perpendicularly from the support and a superposed one of the housing elements adjacent the lowest housing element, the lowest housing element having an upper rim and a free space being defined between the support and the lowest housing element, the joint pivotally interconnecting the housing elements at a side of the upper rim adjoining the free space, and the superposed housing element having a volume and shape corresponding to the volume and shape of the free space.

2. The road traffic warning light of claim 1, wherein the stabilizing means comprises two holding and supporting brackets adapted to be blocked in end positions wherein they embrace the housing elements in their folded condition to form a block.

3. The road traffic warning light of claim 1, wherein the stabilizing means comprises retractable stabilizing elements.

4. The road traffic warning light of claim 1, further comprising a limit switch disposed between the adjacent housing elements.

5. A road traffic warning light comprising a block-shaped housing composed of at least two superposed housing elements, a respective joint pivotally interconnecting adjacent ones of the housing elements for enabling the housing elements to be folded, a respective holding element between the adjacent housing elements for enabling the housing elements to be erected to form a column, a warning light signal transmitter mounted on each one of the superposed housing elements, and means for stabilizing a lowest one of the superposed housing elements in an erect position, the stabilizing means comprising a support and the housing elements consisting of a lowest housing element projecting substantially perpendicularly from the support and two superposed ones of the housing elements adjacent the lowest housing element, the lowest housing element having an upper rim and a free space being defined between the support and the lowest housing element, one of the joints pivotally interconnecting a lower one of the two superposed housing elements to the lowest housing element at one side of the upper rim adjoining the free space, another one of the joints pivotally interconnecting an upper one of the two superposed housing elements to the lower housing element at a side opposite to the one side, and the two superposed housing elements having a volume and shape corresponding to the volume and shape of the free space.

6. The road traffic warning light of claim 5, wherein the stabilizing means comprises two holding and supporting brackets adapted to be blocked in end positions wherein they embrace the housing elements in their folded condition to form a block.

7. The road traffic warning light of claim 5, wherein the stabilizing means comprises retractable stabilizing elements.

8. The road traffic warning light of claim 5, further comprising a limit switch disposed between the adjacent housing elements.

* * * * *